April 18, 1961 A. TURAK 2,980,142
PLURAL DISPENSING VALVE
Filed Sept. 8, 1958 3 Sheets-Sheet 1
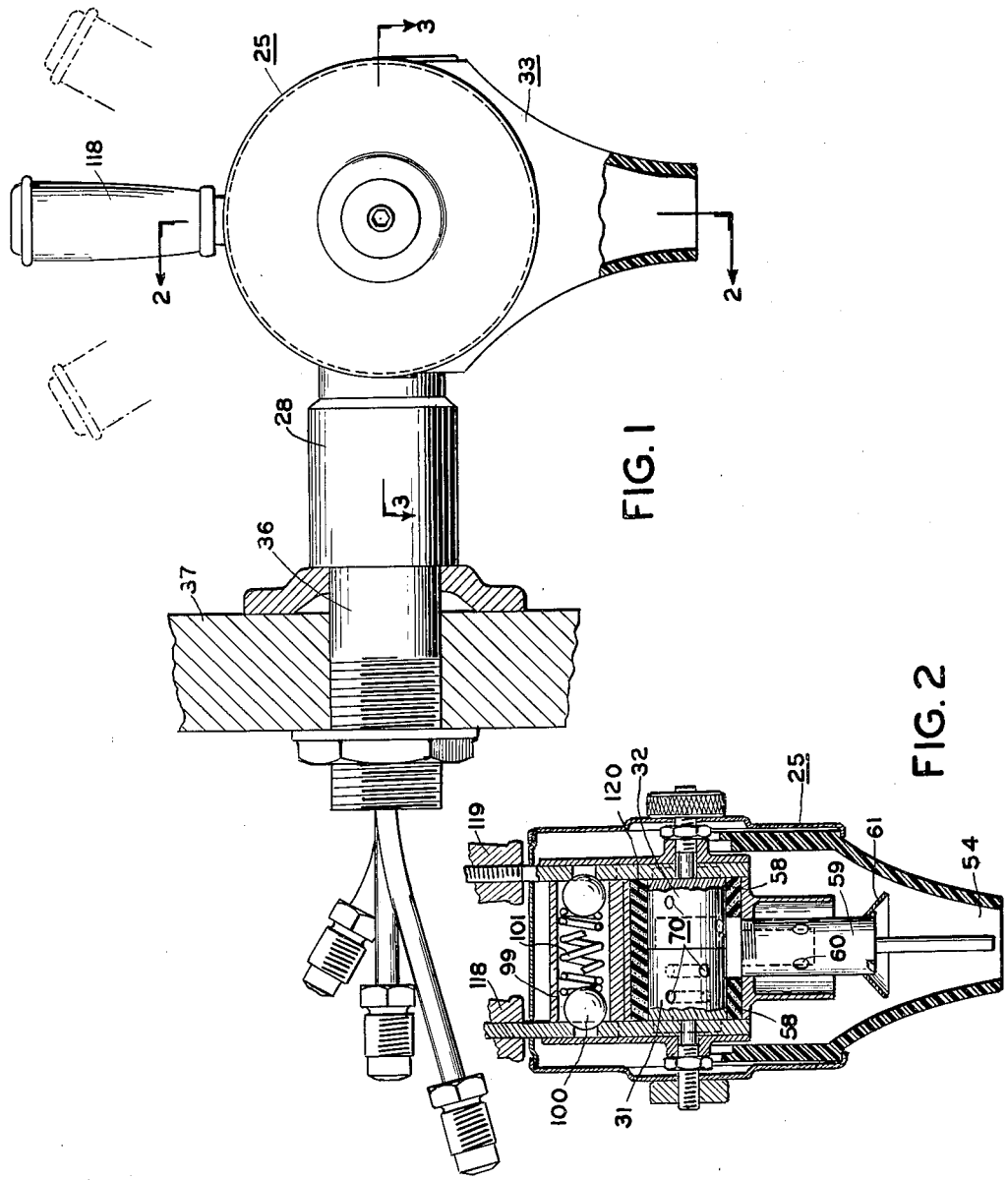
INVENTOR.
ANTHONY TURAK
BY
Woodling and Kroet,
Attys.

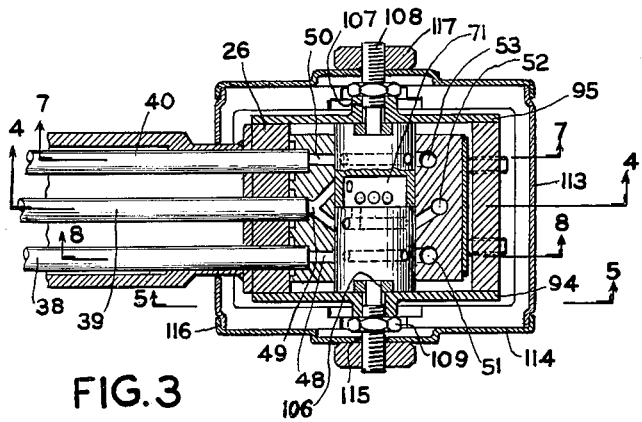
FIG. 3
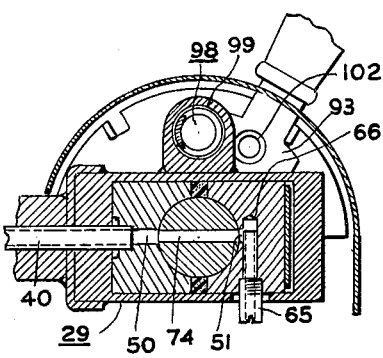
FIG. 7
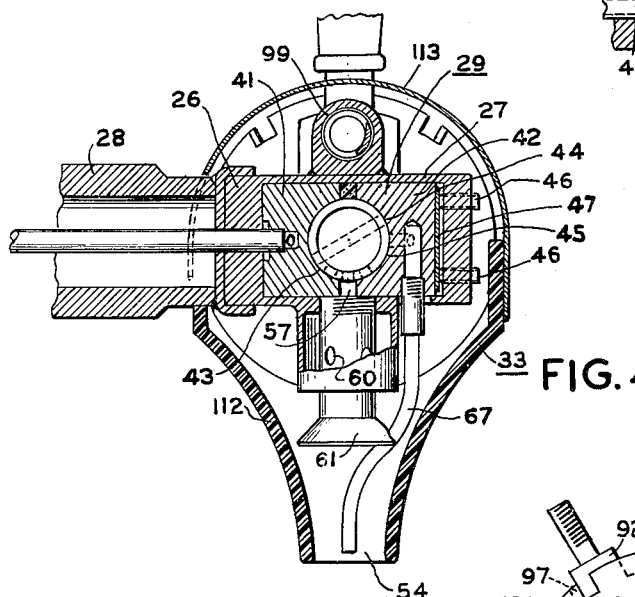
FIG. 4
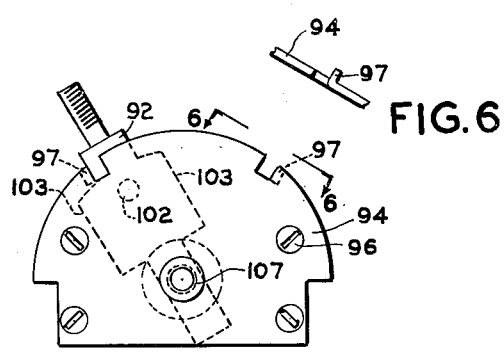
FIG. 6
FIG. 5
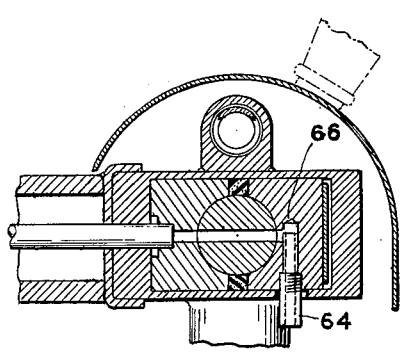
FIG. 8
INVENTOR.
ANTHONY TURAK
BY
Woodling and Krost
attys.

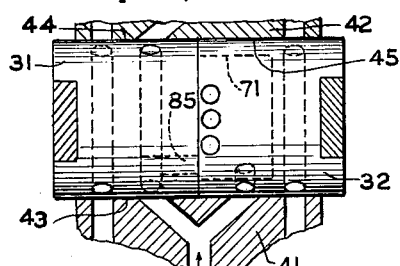
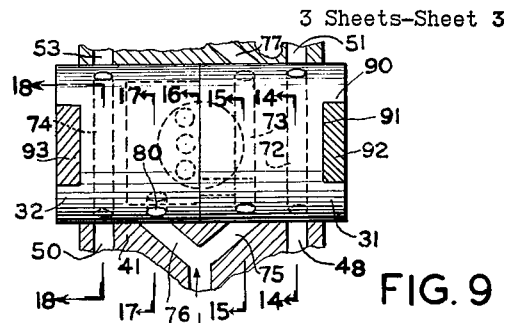
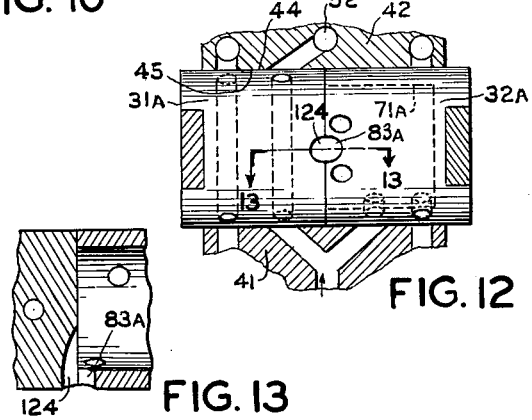
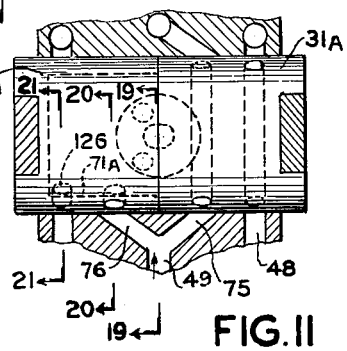
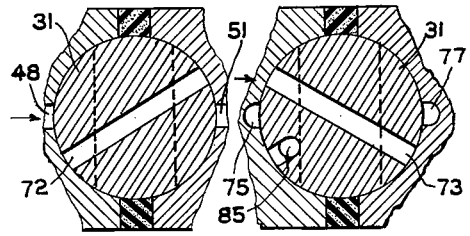
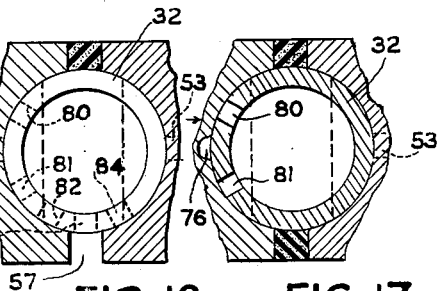
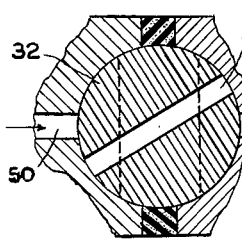
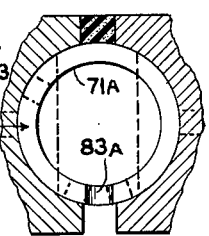
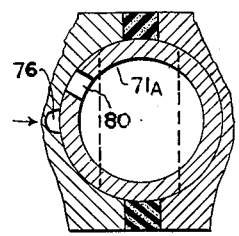
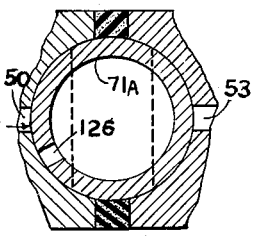

2,980,142
PLURAL DISPENSING VALVE

Anthony Turak, 11208 Lorain Ave., Cleveland, Ohio

Filed Sept. 8, 1958, Ser. No. 759,539

13 Claims. (Cl. 137—637.3)

The invention relates in general to dispensing valves and more particularly to such valves capable of dispensing a plurality of fluids with at least one such fluid having two different dispensing conditions.

The prior art has known dispensing valves such as may be used for soda fountains and the like for dispensing different types and combinations of fluids or liquids, for example, flavored and/or carbonated beverages. In the past many such plural dispensing valves have been large and cumbersome for the number of fluids being dispensed and, accordingly, have not proved satisfactory nor commercially salable.

Accordingly, it is an object of the invention to provide a plural dispensing valve which is small, compact and easy to manufacture.

Another object of the invention is to provide a dispensing valve with plural dispensing conditions with at least one fluid dispensed in two different conditions.

Another object of the invention is to provide a plural dispensing valve wherein a soft soda discharge condition may be established through one outlet and a jet soda discharge condition may be established through a bypass passageway.

Another object of the invention is to provide a plural dispensing valve wherein the flow of fluid is controlled by first and second valve plugs connected in series.

Still another object of the invention is to provide a plural dispensing valve wherein two axially aligned valve plugs may selectively control the flow of fluid either in series or singly.

Still another object of the invention is to provide a plural dispensing valve having two axially aligned valve plugs maintained in abutting relationship by adjustable screws which screws also maintain alignment of bores and conduits within the valve.

Still another object of the invention is to provide a plural dispensing valve which may be readily assembled and disassembled and wherein screw means are used for multi-purpose including alignment of bores and conduits, maintaining valve plugs in abutting relationship, retaining movable handles in the valve, and retaining exterior covers on the valve.

Other objects and a fuller understanding of this invention may be had by referring to the following description and claims, taken in conjunction with the accompanying drawings, in which:

Figure 1 is a side elevational view partially in section of a plural dispensing valve embodying the invention;

Figure 2 is a sectional view on the line 2—2 of Figure 1;

Figure 3 is a sectional view on the line 3—3 of Figure 1;

Figures 4 and 5 are sectional views on the lines 4—4 and 5—5 of Figure 3;

Figure 6 is a sectional view on line 6—6 of Figure 5;

Figures 7 and 8 are sectional views on the line 7—7 and 8—8 of Figure 3;

Figure 9 is a partial top view of the valve plugs and associated conduits;

Figure 10 is a partial bottom view of the valve plugs of Figure 9;

Figure 11 is a partial top view of a modification of the valve plugs which may be used in the dispensing valve;

Figure 12 is a partial bottom view of the plugs of Figure 11;

Figure 13 is a section taken on line 13—13 of Figure 12;

Figures 14 through 18 are sectional views taken on the respective lines 14—14 through 18—18 of Figure 9; and Figures 19, 20 and 21 are sectional views taken on the respective lines 19—19 through 21—21 of Figure 11.

Figures 1 and 2 generally show a dispensing valve 25 which, for purposes of illustration but not limitation, has been shown as a plural discharge condition dispensing valve especially suited for soft drink dispensing. The valve 25 includes generally a base 26, a yoke 27, a tubular housing 28, a body 29, first and second valve plugs 31 and 32, and a housing 33. The tubular housing 28 may include a threaded end 36 for attachment to any suitable support 37 and is hollow to enclose first, second and third inlet lines 38, 39 and 40. These inlet lines are fastened in and extend through the base 26. The yoke 27 is shown as a part of the base 26 and may be either integral or separate and fixedly attached. The yoke surrounds first and second body portions 41 and 42 which together comprise the body 29. The body portions 41 and 42 have first and second complementary cylindrical surfaces 43 and 44 which together define a valve chamber 45. The first and second valve plugs 31 and 32 are cylindrical and are disposed in axially aligned abutting relationship in this valve chamber 45.

The body portions 41 and 42 may be made of some partially resilient material, that is, a material which is resilient relative to steel, for example, Teflon, and set screws 46 may be used to bear against a shim plate 47 and through this onto the body portion 42. Tightening these set screws tightens the two body portions 41 and 42 onto the valve plugs 31 and 32 and also forces the first body portion 41 against the base 26. In so doing, the first body portion 41 is pressed onto the inlet lines 38—40 for a fluid-tight connection. First, second and third entrance conduits 48, 49 and 50 are provided in the first body portion 41 and provide communication from the first, second and third inlet lines 38, 39 and 40, respectively, to the valve chamber 45. First, second and third exit conduits 51, 52 and 53 are provided in the second body portion 42 and lead from the valve chamber 45 to a discharge opening 54 in the lower end of the dispensing valve 25. A body outlet 57 is provided at the lower end of the body 29 and is provided by the space between the lower edges of the body portions 41 and 42. As better shown in Figure 2, resilient blocks 58 are provided between the lower edges of the body portions 41 and 42 on the outboard ends thereof so as to confine the body outlet 57 to the interior of a tube 59, out through holes 60 and over a diffuser 61 to the discharge opening 54. The first and third exit conduits 51 and 53 include syrup control valves 64 and 65, respectively, which may be threaded into the second body portion 42 and be made to approach as closely as desired a dead end surface 66 to control the amount of throttling effect of fluid through these first and third exit conduits. The second exit conduit includes a gooseneck nozzle 67 leading directly to the discharge opening 54. The fluid dispensed through the syrup control valves 64 and 65 will flow in the interior of the housing 33 and thus be controlled by the action of the diffuser 61.

The valve plugs 31 and 32 are provided with a plurality bore means 70 at different angular positions for selective registration with the entrance and exit conduits to establish a total of four different fluid dispensing conditions of the valve 25. The first inlet line 39 and the second exit conduit 52 lie substantially on a central plane, which is the plane of the Figure 4 and which plane is substantially normal to the axis of the valve plugs 31 and 32. The two valve plugs 31 and 32 abut each other substantially on this central plane and an axial recess 71 is a part of the bore means 70 and extends away from the abutting surface in the second valve plug 32. The bore means 70 also includes a first transverse bore 72 for providing communication between the first entrance conduit 48 and the first exit conduit 51 with the first valve plug 31 in the second of two positions. Each valve plug may have first and second positions on either side of a neutral position, which neutral position is that shown in Figures 1–4 and 9–21. The first position is thus that wherein either valve plug is rotated counterclockwise about thirty degrees, as seen in Figure 1 or Figures 14–21, and the second position is when either valve plug has been rotated approximately thirty degrees clockwise from the neutral position. A second transverse bore or by-pass passageway 73 is provided to provide selective communication from the second entrance conduit 49 to the second exit conduit 52 with the first valve plug 31 in the first position. A third transverse bore 74 provides selective communication from the third entrance conduit 50 to the third exit conduit 53 with the second valve plug 32 in the second position. The second entrance conduit 49 is generally Y-shaped and includes first and second angle conduits 75 and 76. A third angle conduit 77 is provided in the second body portion 42 and is a part of the second exit conduit 52 and joins it to the valve chamber 45.

First and second transverse bore inlets 80 and 81 lead into the recess 71 at different angular positions. The first transverse bore inlet 80 communicates with the second angle conduit 76 with the second valve plug 32 in the first position. The second transverse bore inlet 81 communicates with the second angle conduit 76 with the second valve plug 32 in the second position. First, second and third transverse bore outlets lead from the recess 71 to the body outlet in the first, neutral and second positions of the second valve plug 32, respectively. An angle bore 85 provides communication from the first angle conduit 75 to the recess 71 with the first valve plug 31 in the second position.

Two shoulders 90 are provided on the outboard ends of each valve plug 31 and 32 with the two shoulders on each plug providing a groove 91. First and second flat handles 92 and 93 are disposed in these grooves to transversely engage the valve plugs 31 and 32 so that these valve plugs may be arcuately moved. First and second frame plates 94 and 95 are fixedly attached to the axially outboard ends of the base 26 and yoke 27 by any suitable means such as screws 96 with these frame plates spaced from the body 29 and closely adjacent the ends of the shoulders 90. The handles 92 and 93 are disposed between the respective frame plate and the groove in the valve plug. Each frame plate has lugs 97 turned down to provide a stop for the handles 92 and 93 to clearly establish the first and second positions of the handles and hence of the valve plugs. A detent mechanism 98 includes a tube 99 carried on the top of the yoke 27 and containing two detent balls 100 urged outwardly by a spring 101. Each handle contains a detent hole 102 for cooperation with the corresponding detent ball 100 in the neutral position of the handle, and the side surfaces 103 of each handle provide additional detent surface for cooperation with the detent balls 100 when the handles are in either the first or second positions.

An access aperture is provided in each handle along the axis of the valve plugs. A threaded aperture 107 is provided coaxially in each of the frame plates 94 and 95. Flat ended set screws 108 are provided in each of the threaded apertures 107 and extend through the extended apertures 106 to bear against the grooves 91. Lock nuts 109 are provided on the set screws 108 exterior to the frame plates 94 and 95 to lock the set screws in place.

The housing 33 includes generally a lower housing section 112 which may conveniently be made of plastic material, and an upper housing section 113. Two circular cover plates 114 are provided on the axial ends of the valve 25, and each have apertures 115 to be received on the set screws 108. The cover plates 114 may have flanges 116 to encompass portions of the upper and lower housing sections to hold them on the valve 25. Knurled nuts 117 may be threaded on the set screws 108 to hold the cover plates 114 in place. First and second knobs 118 and 119 may be threaded onto the first and second handles 92 and 93, respectively.

The set screws 46 may be tightened to tighten the body portions 41 and 42 on the valve plugs 31 and 32 to provide good sealing engagement for leak-free operation of the valve 25. This tightening also presses the entrance conduits 48—50 onto the inlet lines 38—40 to provide leak-free connection at these points. The resilient blocks 56, and if desired an additional resilient block 120 at the top of the body portions 41 and 42, may be provided to restrict the fluid flow to the body outlet 57. The set screws 108 may be adjusted readily to assure that the two valve plugs 31 and 32 abut on the central plane in a substantially fluid-tight connection. The set screws 108 additionally provide adjustment for the valve plugs 31 and 32 to adjust the axial position of the bore means 70 relative to the entrance and exit conduits 48—53. The axial dimension across the grooves of the two valve plugs in abutting relationship is substantially equal to the axial dimension of the body 29. This means that the flat handles 92 and 93 will lie closely adjacent the outboard faces of the body 29. The distance between the outboard faces of the body 29 and the frame plates 94 and 95 is only slightly greater than the thickness of the handles 92 and 93; hence, these handles are means for establishing the valve plugs 31 and 32 in a position so that the bore means 70 are axially in registration with the conduits 48—53. The set screws 108, in extending through the access aperture 106, retain the handles 92 and 93 transversely so that these handles are retained in the valve 25. The set screws 108 also provide threaded connection to the knurled nuts 117 so that the cover plates 114 may be retained in place.

With the first handle 92 in the first position, such as is shown in Figure 5, the by-pass passageway 73 provides fluid communication from the second inlet line 39 through the first and third angle conduits 75 and 77 and through the gooseneck nozzle 67 direct to the discharge opening 54. This provides a jet discharge and, where soda water, for example, is supplied to the second inlet line 39, this will be a jet discharge of soda water. This type of discharge is used in soda fountains for mixing ice cream sodas. It will be noted that the second inlet line 39 and the second exit conduit 52 lie substantially on a central plane normal to the axis of the valve 25 which central plane is generally on the plane of abutment of the first and second valve plugs 31 and 32. This by-pass passageway 73 is generally parallel to but displaced from this central plane and hence by-passes the recess 71 and more importantly by-passes this junction of the valve plugs 31 and 32. It is important for the conserving of space and the maximum utilization of space in the valve body portions 41 and 42 that the three inlet lines 38—40 be symmetrically and equally spaced therein. Also, the exit conduits 51—53 should be symmetrically and equally spaced. To meet this requirement the first and third angle conduits 75 and 77 are angled in opposite directions relative to the central plane so as to provide fluid communication between the by-pass passageway 73 and the second entrance and exit conduits 49 and 52. Similarly, the second angle conduit 76 extends from the second entrance conduit 49 on the central plane to a position off the central plane so as to be in axial registration with the first and second transverse bore inlets 80 and 81 as shown in Figures 9 and 17.

When the first handle 92 is moved to the second position, as shown in dotted lines in Figure 8, fluid communication is provided to the discharge opening 54 from two sources. One of these routes is from the first inlet line 38 through the first transverse bore 72, the first exit conduit 51, the syrup control valve 64, and down the inside of the lower housing section 112 to the discharge opening 54. This could be a concentrate or syrup, for example, a cola syrup. The other route comes from the second inlet line 39 which, as heretofore stated, might be soda water. This soda water flows through the first angle conduit 75, the angle bore 85, the recess 71, the second transverse bore outlet 83, the body outlet 57, holes 60 to flow over the diffuser cone 61 to the discharge opening 54. The holes 60 and the diffuser 61 break up the flow of soda water and permit its escaping into a large volume so as to release the gas contained in the soda water and thus a soft soda discharge is achieved rather than a jet soda discharge. Also, the fact that the diffuser 61 is cone shaped spreads the flow of soda water completely around the interior of the lower housing section 112 to wash same free of the concentrate or syrup.

When the second handle 93 is moved to the first position, only a soft soda discharge condition is obtained. The route for this fluid discharge is from the second inlet line 39, through the second angle conduit 76, the first transverse bore inlet 80, the first transverse bore outlet 82, the body outlet 57, and diffuser 61 to the discharge opening 54.

When the second handle 93 is moved to the second position, as shown in Figure 7, two different fluid discharge conditions are established. One route for fluid is as shown in Figure 7 and starts from the third inlet line 40 which may contain a concentrate or syrup, such as ginger ale, for example. This fluid route goes through the third entrance conduit 50, the third transverse bore 34, the third exit conduit 51, and the syrup control valve 65 to the discharge opening 54. The second route is from the soda water or second inlet line 39 and continues through the second angle conduit 76, the second transverse bore inlet 81, the third transverse bore outlet 84, the body outlet 57, and diffuser 61 to the discharge opening 54. Again this position provides an intermixed discharge of two fluids which by way of example has been shown as ginger ale syrup and soda water to make a ginger ale flavored beverage.

The angle bore 85 has been shown as having two portions mutually perpendicular. The first, second and third angle conduits 75—77 have been shown as being straight but extending at an angle such as forty-five degrees relative to the central plane. Either of these two types of structures may be used to provide fluid communication between two points generally located on a line at a forty-five degree angle to this central plane.

When the first handle 92 is in the first position, this means the second transverse bore or by-pass passageway 73 is in use and, hence, only a single valve plug controls the flow of fluid. When the first handle 92 is in the second position, fluid flow is through the angle bore 85 and the recess 71 including the second transverse bore outlet 83 to the body outlet 57. As such, both the first and second valve plugs 31 and 32 control the fluid discharge condition because these two valve plugs are connected in series for this particular fluid routing. When the first handle 92 is in the second position, fluid flow has two routes, one through the first transverse bore 72 alone and the other route through the angle bore 85, recess 71, and second transverse bore outlet 83 which means that both valve plugs 31 and 32 are in series. Thus, it will be seen that the dispensing valve 25 is arranged so that the valve plugs 31 and 32 control the fluid flow either singly or in series or a combination of both.

Figures 11 and 12 show a modification of the invention wherein the first valve plug may be slightly modified to be a valve plug 31A. The second valve plug is replaced by a second valve plug 32A. The change in the first valve plug 31A is that it may have a fourth transverse bore outlet 124, as shown in Figure 13, to increase the outlet area so that full fluid flow may result even with low pressure soda water. This change may be utilized in the preferred embodiment of Figures 9 and 10 if desired.

The second valve plug 32A may replace the second valve plug 32 without any other change to the dispensing valve 25 where it is desired to use the valve 25 with a pre-mixed beverage supplied to the third entrance conduit 50. The valve plug 32A contains a deeper axial recess 71A which is deep enough to be axially opposite the third entrance conduit 50. A third transverse bore inlet 126 leads from this third entrance conduit 50 into the recess 71A. This pre-mixed beverage would be one which does not require mixing with the soda water in the inlet line 39; hence, no fluid passage for this second inlet line 39 is provided in this second position of the second handle 93. The soft soda water discharge condition is still provided through the first transverse bore inlet 80 with the second handle 93 in the first position. The second valve plug 32A may further be slightly modified by moving the central transverse bore outlet 83A to merge with the fourth transverse bore outlet 124 to provide a single enlarged opening.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A four-way dispensing valve comprising, in combination, a body, surface means in said body defining a valve chamber, first and second axially aligned abutting cylindrical valve plugs contained within said valve chamber, a discharge opening in said dispensing valve, a plurality of entrance conduits in said body leading to said valve chamber, a plurality of exit conduits in said body leading from said valve chamber and passing to said discharge opening, a plurality of bore means at different angular positions in each of said valve plugs and arranged for selective registration with said conduits in first and second positions of each said valve plug, first and second handles engaging said first and second valve plugs, respectively, for arcuate movement, access apertures in each said handle, set screws engaging said body and coaxially aligned with said valve plugs and extending through said access apertures to hold said handles transversely in place, to maintain said valve plugs in abutting engagement, and to adjust the axial position of said bore means relative to said conduits, cover means for said dispensing valve and having apertures receivable on said set screws, and knurled nuts engaging said set screws to retain said cover means on said dispensing valve.

2. A dispensing valve comprising, in combination, a base, a body affixed to said base, surface means in said body defining a valve chamber, first and second axially aligned abutting cylindrical valve plugs contained within said valve chamber, a discharge opening in said dispensing valve, a plurality of entrance conduits in said body leading to said valve chamber, a plurality of exit conduits in said body leading from said valve chamber to said discharge opening, a plurality of bore means transversely through said valve plugs at different angular positions and arranged for selective registration with said conduits in first and second positions, first and second flat handles engaging the outboard ends of said first and second valve plugs, respectively, first and second frame plates fixedly attached to the two axial ends of said base and disposed closely adjacent the outer surface of said handles, the combination of said frame plates and said handles maintaining said bore means in axial registration with said conduits, and set screws threaded in said frame plates and engaging said valve plugs to maintain the inner ends thereof in abutting relationship.

3. A dispensing valve comprising, in combination, a body, surface means in said body defining a valve chamber, first and second axially aligned abutting cylindrical valve plugs contained in said valve chamber, a plurality of entrance conduits in said body leading to said chamber, a discharge opening in said dispensing valve, a plurality of exit conduits in said body leading from said chamber to said discharge opening, a plurality of bore means at different angular positions in each of said valve plugs and arranged for selective registration with said conduits in first and second positions of each said valve plug, said first and second positions of each said valve plug being on opposite sides of a neutral position, frame plates fastened to said body axially outboard relative to said valve plugs, first and second handles engaging said first and second valve plugs, respectively, and disposed between said body and said frame plates, a threaded aperture in each said frame plate coaxially aligned with said valve plugs, an access aperture larger than said threaded aperture in each said handle and coaxially aligned with said valve plugs, a set screw in each said threaded aperture and in engagement with the end of each said valve plug through said access apertures to adjust the axial position of said valve plug bore means relative to said conduits and to maintain said valve plugs in abutting relationship, and said set screws retaining said handles in a transverse direction in said dispensing valve.

4. A dispensing valve comprising, in combination, a body, surface means in said body defining a valve chamber, first and second axially aligned abutting cylindrical valve plugs contained in said valve chamber, a plurality of entrance conduits in said body leading to said chamber, a discharge opening in said dispensing valve, a plurality of exit conduits in said body leading from said chamber to said discharge opening, a plurality of bore means at different angular positions in each of said valve plugs and arranged for selective registration with said conduits in first and second positions of each said valve plug, said first and second positions of each said valve plug being on opposite sides of a neutral position, shoulders on said valve plugs forming a transverse groove on one end of each valve plug, the axial dimension between the bottoms of said grooves of said two valve plugs in abutting relationship being substantially equal to the axial dimension of said body, frame plates fastened to said body axially outboard relative to said valve plugs and in close spaced relationship relative to said valve plug shoulders, first and second flat handles extending into the grooves of said first and second valve plugs, respectively, and disposed between said valve plug grooves and said frame plates, a threaded aperture in each said frame plate coaxially aligned with said valve plugs, an access aperture larger than said threaded aperture in each said handle and coaxially aligned with said valve plugs, a flat ended set screw in each said threaded aperture and in engagement with said valve plug grooves through said access apertures to adjust the axial position of said valve plug bore means relative to said conduits and to maintain said valve plugs in abutting relationship, and said set screws retaining said handles in a transverse direction in said dispensing valve.

5. A dispensing valve comprising, in combination, a base, a yoke connected to said base, first and second body portions within said yoke, first and second axially aligned abutting cylindrical valve plugs contained between said first and second body portions, a plurality of entrance conduits in said first body portion, a discharge opening in said dispensing valve, a plurality of exit conduits in said second body portion passing to said discharge opening, a plurality of bore means at different angular positions in each of said valve plugs and arranged for selective registration with said conduits in first and second positions of each said valve plug, said first and second positions of each said valve plug being on opposite sides of a neutral position, shoulders on said valve plugs forming a transverse groove on one end of each valve plug, the axial dimension between the bottom of said grooves of said two valve plugs in abutting relationship being substantially equal to the axial dimension of said first and second body portions, frame plates fastened to said base axially outboard relative to said valve plugs and in close spaced relationship relative to said valve plug shoulders, first and second flat handles extending into the grooves of said first and second valve plugs, respectively, and disposed between said valve plug grooves and said frame plates, a threaded aperture in each said frame plate coaxially aligned with said valve plugs, an access aperture larger than said threaded aperture in each said handle and coaxially aligned with said valve plugs, a flat ended set screw in each said threaded aperture and in engagement with said valve plug grooves through said access apertures to adjust the axial position of said valve plug bore means relative to said conduits and to maintain said valve plugs in abutting relationship, said set screws retaining said handles in a transverse direction in said dispensing valve, and lock nuts on said set screws outboard of said frame plates.

6. A four-way dispensing valve comprising, in combination, a base, a yoke connected to said base, first and second body portions within said yoke, first and second axially aligned abutting cylindrical valve plugs contained between said first and second body portions, first, second and third entrance conduits in said first body portion, a discharge opening in said dispensing valve, first, second and third exit conduits in said second body portion passing to said discharge opening, a plurality of bore means at different angular positions in each of said valve plugs and arranged for selective registration with said conduits in first and second positions of each said valve plug, said first and second positions of each said valve plug being on opposite sides of a neutral position, shoulders on said valve plugs forming a transverse groove on one end of each valve plug, the axial dimension between the bottoms of said grooves of said two valve plugs in abutting relationship being substantially equal to the axial dimension of said first and second body portions, frame plates fastened to said base axially outboard relative to said valve plugs and in close spaced relationship relative to said valve plug shoulders, first and second flat handles extending into the grooves of said first and second valve plugs, respectively, and disposed between said valve plug grooves and said frame plates, a threaded aperture in each said frame plate coaxially aligned with said valve plugs, an access aperture larger than said threaded aperture in each said handle and coaxially aligned with said valve plugs, a flat ended set screw in each said threaded aperture and in engagement with said valve plug grooves through said access apertures to adjust the axial position of said valve plug bore means relative to said conduits and to maintain said valve plugs in abutting relationship, said set screws retaining said handles in a transverse direction in said dispensing valve, lock nuts on said set screws outboard of said frame plates, spring urged detent balls engaging three detent surfaces on each said handle to yieldingly retain each handle in said first, second and neutral positions, respectively, cover plates covering the axial ends of said body portions, base, yoke and detent, and knurled nuts engaging said set screws to hold said cover plates in place.

7. A dispensing valve comprising, in combination, a body, surface means in said body defining a valve chamber, first and second valve plugs contained within said valve chamber, a discharge opening in said dispensing valve, at least first and second entrance conduits in said body leading to said valve chamber, at least first and second exit conduits in said body leading from said valve chamber and passing to said discharge opening, a plurality of bore means at different angular positions in said valve plugs and arranged for selective registration with said conduits in first and second positions of each valve plug, a by-pass passageway in said first valve plug as part of said bore means, a first angle conduit in said body extending at an angle to said axis and providing selective communication between said second entrance conduit and said by-pass passageway, a second angle conduit in said body extending at an angle to said axis and providing selective communication between said second exit conduit and said by-pass passageway, and an angle bore as part of said bore means providing communication between said first angle conduit and said discharge opening through said first and second valve plugs in series when said first valve plug is in said second position.

8. A dispensing valve comprising, in combination, a body, surface means in said body defining a valve chamber, first and second axially aligned abutting cylindrical valve plugs contained within said valve chamber, a discharge opening in said dispensing valve, at least first and second entrance conduits in said body leading to said valve chamber, at least first and second exit conduits in said body leading from said valve chamber and passing to said discharge opening, a plurality of bore means at different angular positions in each of said valve plugs and arranged for selective registration with said conduits in first and second positions of each said valve plug, said bore means including an axial recess in said second valve plug extending from said abutting surface and including a by-pass passageway, a first angle conduit in said body extending at an acute angle to said axis and providing selective communication between said second entrance conduit and said by-pass passageway, a second angle conduit in said body extending at an acute angle to said axis and providing selective communication between said second exit conduit and said by-pass passageway, and an angle bore as part of said bore means providing communication between said first angle conduit and said recess with said first valve plug in said second position to provide fluid communication from said second inlet line to said discharge opening through said first and second valve plugs in series.

9. A dispensing valve with plural dispensing conditions comprising, in combination, a body, surface means in said body defining a valve chamber, first and second axially aligned abutting cylindrical valve plugs contained within said valve chamber, a discharge opening in said dispensing valve, at least first and second entrance conduits in said body leading to said valve chamber, at least first and second exit conduits in said body leading from said valve chamber and passing to said discharge opening, a plurality of bore means at different angular positions in each of said valve plugs and arranged for selective registration with said conduits in first and second positions of each said valve plug, said entrance and exit conduits being substantially on a plane of said body substantially normal thereto, said bore means including an axial recess in said second valve plug extending from said abutting surface and including transverse bore outlets providing communication between said recess and said discharge opening, a by-pass passageway in said first valve plug as part of said bore means, a first angle conduit in said body extending at an angle to said plane and providing selective communication between said second entrance conduit and said by-pass passageway, a second angle conduit in said body extending at an angle to said plane and providing selective communication between said second exit conduit and said by-pass passageway, and an angle bore as part of said bore means providing communication between said first angle conduit and said recess with said first valve plug in said second position to provide fluid communication from said second inlet line to said discharge opening through said first and second valve plugs in series.

10. A four-way dispensing valve comprising, in combination, a body, surface means in said body defining a valve chamber, first and second axially aligned abutting cylindrical valve plugs contained within said valve chamber, a body outlet at the lower portion of said body, a diffuser in said body outlet, a discharge opening in said dispensing valve, at least first and second entrance conduits in said body leading to said valve chamber, at least first and second exit conduits in said body leading from said valve chamber and passing to said discharge opening, a plurality of bore means at different angular positions in each of said valve plugs and arranged for selective registration with said conduits in first and second positions of each said valve plug, said first and second positions of each said valve plug being on opposite sides of a neutral position, said second entrance and exit conduits being on a central plane of said body substantially normal thereto and substantially on the junction line of said first and second valve plugs, said bore means including an axial recess in said second valve plug extending from said abutting surface and including two transverse bore inlets and three transverse bore outlets communicating with said recess, a by-pass passageway in said first valve plug as part of said bore means, a first angle conduit in said body extending at an angle to said central plane and providing selective communication between said second entrance conduit and said by-pass passageway, a second angle conduit in said body extending at an angle to said central plane and providing selective communication between said second exit conduit and said by-pass passageway, said second exit conduit bypassing said diffuser and communicating directly with said discharge opening, said three bore outlets communicating with said discharge opening through said body outlet and said diffuser, and an angle bore as part of said bore means providing communication between said first angle conduit and said recess with said first valve plug in said second position to provide fluid communication from said second inlet line to said body outlet through said first and second valve plugs in series.

11. A four-way dispensing valve comprising, in combination, a base, a yoke connected to said base, first and second body portions within said yoke, surface means in said body portions defining a valve chamber, first and second axially aligned abutting cylindrical valve plugs contained within said valve chamber, a body outlet between the lower edges of said body portions, a diffuser in said body outlet, a discharge opening in said dispensing valve, first, second and third entrance conduits in said first body portion leading to said valve chamber, first, second and third exit conduits in said second body portion leading from said valve chamber and passing to said discharge opening, a plurality of bore means at different angular positions in each of said valve plugs and arranged for selective registration with said conduits in first and second positions of each said valve plug, said first and second positions of each said valve plug being on opposite sides of a neutral position, said second entrance conduit and said second exit conduit being on a central plane of said body portions substantially normal thereto and substantially on the junction line of said first and second valve plugs, said bore means including an axial recess in said second valve plug extending from said abutting surface and including two transverse bore inlets and three transverse bore outlets communicating with said recess, said bore outlets also communicating with said body outlet, a by-pass passageway in said first valve plug as part of said bore means substantially parallel to but displaced from said central plane, a first angle conduit in said first body portion extending at an angle to said central plane and providing communication between said second entrance conduit and said by-pass passageway with said first valve plug in said first position, a second angle conduit in said second body portion extending at generally the opposite angle to said central plane and providing communication between said second exit conduit and said bypass passageway with said first valve plug in said first position, said second exit conduit bypassing said diffuser and communication directly with said discharge opening, said three bore outlets communicating with said discharge opening through said body outlet and said diffuser, and an angle bore as part of said bore means providing communication between said first angle conduit and said recess with said first valve plug in said second position to provide fluid communication from said second entrance conduit to said body outlet through said first and second valve plugs in series.

12. A four-way dispensing valve comprising, in combination, a base, a yoke connected to said base, first and second body portions within said yoke, surface means in said body portions defining a valve chamber, first and second axially aligned abutting cylindrical valve plugs contained within said valve chamber, a body outlet between the lower edges of said body portions, a diffuser in said body outlet, a discharge opening in said dispensing valve, first, second and third entrance conduits in said first body portion leading to said valve chamber, first, second and third exit conduits in said second body portion leading from said valve chamber and passing to said discharge opening, a plurality of bore means at different angular positions in each of said valve plugs and arranged for selective registration with said conduits in first and second positions of each said valve plug, said first and second positions of each said valve plug being on opposite sides of a neutral position, said second entrance conduit and said second exit conduit being on a central plane of said body portions substantially normal thereto and substantially on the junction line of said first and second valve plugs, said bore means including an axial recess in said second valve plug extending from said abutting surface and including two transverse bore inlets and three transverse bore outlets communicating with said recess, said bore outlets also communicating with said body outlet, a by-pass passageway in said first valve plug as part of said bore means substantially parallel to but displaced from said central plane, a first angle conduit in said first body portion extending at an angle to said central plane and providing communication between said second entrance conduit and said by-pass passageway with said first valve plug in said first position, a second angle conduit in said second body portion extending at generally the opposite angle to said central plane and providing communication between said second exit conduit and said by-pass passageway with said first valve plug in said first position, said second exit conduit bypassing said diffuser and communicating directly with said discharge opening, said three bore outlets communicating with said discharge opening through said body outlet and said diffuser, an angle bore as part of said bore means providing communication between said first angle conduit and said recess with said first valve plug in said second position to provide fluid communication from said second entrance conduit to said body outlet through said first and second valve plugs in series, a first transverse bore in said first valve plug as part of said bore means capable of selective registration with said first entrance and exit conduits, and a second transverse bore in said second valve plug as part of said bore means capable of selective registration with said third entrance and exit conduits.

13. A four-way dispensing valve comprising, in combination, a base, a yoke connected to said base, first and second body portions within said yoke, surface means in said body portions defining a valve chamber, first and second axially aligned abutting cylindrical valve plugs contained within said valve chamber, a body outlet between the lower edges of said body portions, a diffuser in said body outlet, a discharge opening in said dispensing valve, first, second and third entrance conduits in said first body portion leading to said valve chamber, first, second and third exit conduits in said second body portion leading from said valve chamber and passing to said discharge opening, a plurality of bore means at different angular positions in each of said valve plugs and arranged for selective registration with said conduits in first and second positions of each said valve plug, said first and second positions of each said valve plug being on opposite sides of a neutral position, said second entrance conduit and said second exit conduit being on a central plane of said body portions substantially normal thereto and substantially on the junction line of said first and second valve plugs, said bore means including an axial recess in said second valve plug extending from said abutting surface and including two transverse bore inlets and three transverse bore outlets communicating with said recess, said axial recess extending into said second valve plug a distance sufficient to be in line said third entrance conduit, a third transverse bore inlet in said second valve plug as part of said bore means capable of selective registration with said third entrance conduit and leading into said axial recess, said bore outlets also communicating with said body outlet, a by-pass passageway in said first valve plug as part of said bore means substantially parallel to but displaced from said central plane, a first angle conduit in said first body portion extending at an angle to said central plane and providing communication between said second entrance conduit and said by-pass passageway with said first valve plug in said first position, a second angle conduit in said second body portion extending at generally the opposite angle to said central plane and providing communication between said second exit conduit and said by-pass passageway with said first valve plug in said first position, said second exit conduit bypassing said diffuser and communicating directly with said discharge opening, said three bore outlets communicating with said discharge opening through said body outlet and said diffuser, and an angle bore as part of said bore means providing communication between said first angle conduit and said recess with said first valve plug in said second position to provide fluid communication from said second entrance conduit to said body outlet through said first and second valve plugs in series.

References Cited in the file of this patent
UNITED STATES PATENTS

| | | |
|---|---|---|
| 1,981,496 | Buttner | Nov. 20, 1934 |
| 2,548,641 | Whipple | Apr. 10, 1951 |
| 2,558,260 | Maky | June 26, 1951 |
| 2,574,906 | Braun | Nov. 13, 1951 |
| 2,733,730 | Turak | Feb. 7, 1956 |